United States Patent [19]

Smedberg

[11] 3,914,489
[45] Oct. 21, 1975

[54] HIGH PERFORMANCE HOT MELT ADHESIVE BACKSIZING COMPOSITIONS AND CARPET MADE THEREWITH

[75] Inventor: George Elmer Smedberg, Wilmington, Del.

[73] Assignee: E. I. Du Pont de Nemours & Company, Wilmington, Del.

[22] Filed: Sept. 26, 1974

[21] Appl. No.: 509,562

[52] U.S. Cl............ 428/97; 260/28.5 AV; 260/887
[51] Int. Cl.² ................... D03D 27/00; D04H 11/00
[58] Field of Search ............................... 161/62–67; 117/136, 138.8 A, 143 A, 161 UZ, 161 UD, 161 UH, DIG. 5; 260/28.5 AV, 887, 897 R, 897 A, 897 B, 901

[56] References Cited
UNITED STATES PATENTS
3,583,936   6/1971   Stahl........................... 260/28.5 AV Primary Examiner—Marion E. McCamish

[57] ABSTRACT

Hot melt backsize compositions having high tensile elongation which result in tufted carpets having improved tuft bind comprise a blend of ethylene/vinyl ester copolymer, hydrocarbon resin, and, optionally, low molecular weight polyethylene, paraffin wax, antioxidant and filler.

10 Claims, No Drawings

HIGH PERFORMANCE HOT MELT ADHESIVE BACKSIZING COMPOSITIONS AND CARPET MADE THEREWITH

BACKGROUND OF THE INVENTION

1. Field of the Invention

This invention relates to carpet backsizing, and more particularly it relates to hot melt backsizing compositions which result in carpets having high tuft bind.

2. Description of the Prior Art

Backsizing of tufted carpets with hot melt backsize adhesives has been known now for some years. U.S. Pat. No. 3,551,231 discloses a process for applying a hot melt backsize adhesive blend of ethylene/vinyl ester copolymer, petroleum wax, and a thermoplastic resin. Satisfactory carpets are made by applying a critical pressure on the tufted structure while it is in contact with the hot melt adhesive applicator roll. The necessity of maintaining such critical pressure during the adhesive application detracts from process flexibility.

U.S. Pat. No. 3,684,600 discloses the application of a low viscosity precoat adhesive to the backside of the tufted structure prior to the application of the hot melt backsize adhesive composition. By using the precoat adhesive, the necessity of maintaining a critical pressure on the carpet during the hot melt adhesive application can be eliminated. The backsize adhesive composition contains ethylene/vinyl ester copolymer, low molecular weight, low density polyethylene, microcrystalline wax, aliphatic thermoplastic hydrocarbon resin, dicyclopentadiene alkylation polymer, antioxidant and filler.

U.S. Pat. No. 3,583,936 discloses a hot melt backsize adhesive composition comprising an ethylene/vinyl ester or acrylate polymer, a wax of sufficiently high melting point to yield a blend softening point of at least 190°F., a blend of aliphatic thermoplastic hydrocarbon resin and a dicyclopentadiene alkylation polymer, and optionally a filler.

U.S. Pat. No. 3,745,054 relates to high filler content hot melt backsize adhesive compositions comprising ethylene/vinyl ester copolymer, paraffin wax, microcrystalline wax, aliphatic thermoplastic hydrocarbon resin, dicyclopentadiene alkylation polymer, antioxidant and filler.

Previously filler containing hot melt blends have been used to produce carpets having tuft binds which generally average in the 8–10 pound range. This has been adequate for domestic carpets used in the home but higher tuft binds (average 18 pounds or greater) are desired by the carpet industry for contract carpet which up to the present has not been attainable.

SUMMARY OF THE INVENTION

According to the present invention there is provided a composition having a tensile elongation of about 700–1500 percent, preferably about 900–1000 percent comprising (A) about 15–30 (preferably about 18–22) weight percent ethylene/vinyl ester copolymer having a melt index of about 2 to 100 (preferably about 10-25), a copolymerized ethylene content of about 67 to 84 (preferably about 74–77) weight percent, a copolymerized vinyl ester content of about 16 to 33 (preferably about 23–26) weight percent, wherein the acid moiety of said vinyl ester contains 1–4 (preferably 2–3) carbon atoms, (B) about 30–70 (preferably about 40–50) weight percent of a hydrocarbon resin or a mixture of several hydrocarbon resins having a ring and ball softening point of about 50°C.–70°C. and a viscosity of 0.5 to 1.5 poise at 135°C., and optionally (C) 0 to about 5 weight percent of a low molecular weight ethylene homopolymer having a molecular weight of about 1500–4000, density of 0.91–0.96 g./cm.$^3$ and a melting point of about 220°F.–270°F., (D) 0 to about 5 weight percent of a paraffin wax, (E) an effective amount of an antioxidant, and (F) 0 to about 40 weight percent filler.

According to the present invention there are further provided carpets having improved tuft bind, at least an average of 18 pounds, obtained by the use of the above compositions and carrying out the backsizing according to the process of U.S. Pat. No. 3,551,231.

DETAILED DESCRIPTION OF THE INVENTION

It has been discovered that a hot melt formation as described above will produce carpets having high tuft binds which have not been possible with the type of hot melt blends previously available for carpet backsizing. The higher performance is attributed to the type of hydrocarbon resin (B) used and the resultant high tensile elongation of the hot melt composition.

Hydrocarbon resins suitable for use in the high performance hot melt backsize compositions are classified as low molecular weight alkyl-aromatic hydrocarbon resins of the non-reactive, thermoplastic hydrocarbon types. Generally, they range in ring and ball softening point, as measured by ASTM E 28–67, from about 10°C.–120°C. and have viscosities measured at 135°C. of about 0.5–1.5 poises. Certain of these are low molecular weight dicyclopentadiene alkylation polymers and may be prepared according to U.S. Pat. No. 3,023,200. Included in this type are the "Piccovar" resins. The softening point of the resin, or of the mixture of resins, if more than one is employed, has to be between about 50°C.–40°C. If the softening point of the resin(s) is less than about 50°C. the blend viscosity and tensile elongation are too low. If the softening point is higher than about 70°C. the blend viscosity is too high and the blend tensile elongation is too low to yield the desired high tuft bind.

Tables A and B list some of the commercially available hydrocarbon resins which, when used in the hot melt blend, yield the desired specifications for a high performance hot melt blend. Some of these resins can be used alone, while others must be used in admixture with one or more of the resins to obtain the desired physical properties in the final hot melt blend.

TABLE A

| HYDROCARBON RESINS USED SINGLY | |
|---|---|
| | Ring and Ball Softening Point,°C. |
| Resin 1 - "Piccovar" L 60 (Hercules Inc.) | 60/60.5 |
| Resin 2 - "Velsicol" XL39 (Velsicol Chemical Co.)[(1)] | 64/64.5 |
| Resin 3 - "Neville" DH-5-6 (Neville Chemical Co.) | 55.5/56 |

TABLE B

HYDROCARBON RESINS FOR USE WITH ANOTHER HYDROCARBON RESIN OR RESINS

| | Ring and Ball Softening Point,°C. |
|---|---|
| Resin 4 - "Piccovar" 75 (Hercules Inc.) | 75/75 |
| Resin 5 - "Piccovar" L30 (Hercules Inc.) | 30/31 |
| Resin 6 - "Wingtack" 95 (Goodyear Tire and Rubber Co.)[2] | 95/96 |
| Resin 7 - "Wingtack" 10 (Goodyear Tire and Rubber Co.)[2] | 10/12 |
| Resin 8 - "Wingtack" 115 (Goodyear Tire and Rubber Co.)[2] | 115/116 |

[1]"Velsicol" XL39 is a thermoplastic hydrocarbon polymer derived from petroleum stocks having a highly aromatic structure and exhibiting a low level of unsaturation.
[2]"Wingtack" 95, 10 and 115 are synthetic polyterpene resins.

In Table I are presented data showing tensile elongation and other physical properties of hot melt adhesive compositions prepared with the indicated hydrocarbon resins.

235°F.–240°F., is of benefit to the carpet installer if it becomes necessary to heat-seam two adjacent carpet sections. This ingredient does not appreciably affect the elongation of the composition nor the tuft bind of

TABLE I

| | | | Properties of Final Filled Blend[1] | | |
|---|---|---|---|---|---|
| Blend No. | Hydrocarbon Resin | Tensile lb./in.[2(2)] | Percent Tensile Elongation[2] | Ring and Ball Softening Point, °F. | Viscosity cps. at 310°F. |
| 1 | "Piccovar" L60 | 250 | 950 | 235 | 10,000 |
| 2 | "Velsicol" XL39 | 250 | 930 | 240 | 11,000 |
| 3 | (50/50) "Piccovar" 75/"Piccovar" L30 | 210 | 730 | 240 | 11,000 |
| 4 | (50/50) "Wingtack" 95/"Wingtack" 10 | 225 | 600 | 258 | 7,000 |
| 5 | (25/25/50) "Wingtack" 95/"Wingtack" 10/ "Piccovar" L60 | 153 | 850 | 238 | 7,500 |
| 6 | (50/50) "Wingtack" 115/"Wingtack" 10 | 134 | 750 | 237 | 8,000 |
| 7 | (50/50) "Piccovar" L60/"Velsicol" XL39 | 234 | 889 | 240 | 10,500 |
| 8 | (25/75) "Piccovar" L60/"Velsicol" XL39 | 249 | 861 | 247 | 12,000 |
| 9 | (75/25) "Piccovar" L60/"Velsicol" XL39 | 249 | 962 | 245 | 11,000 |
| 10 | "Wingtack" 10 | 17 | 58 | 240 | 5,000 |
| 11 | "Piccovar" 75 | 350 | 40 | 249 | 26,000 |
| 12 | "Wingtack" 95 | 750 | 13 | 240 | 16,000 |

[1]Composition:
19.8% ethylene/vinyl acetate copolymer, melt index 17–21, vinyl acetate content 25%.
2.2% "Pacemaker" 53 wax, available from Cities Service Oil Company.
2.9% "Polywax" 2000, polyethylene, molecular weight 2000, density 0.96, available from Petrolite Corp. (Bareco Div.).
45.0% hydrocarbon resin
0.1% BHT (butylated hydroxytoluene).
30.0% No. 9 Whiting (CaCO$_3$ filler)
[2]as measured by ASTM D 1708-4 at a crosshead speed of 2 in./min.

Ethylene copolymers most useful in the present invention are copolymers of ethylene with vinyl esters of lower carboxylic acids. Such ethylene/vinyl ester copolymers can be prepared by known techniques, such as illustrated in U.S. Pat. No. 2,200,429 and U.S. Pat. No. 2,703,794. While an ethylene/vinyl acetate copolymer is preferred, other ethylene copolymers, such as those of vinyl formate, vinyl propionate, and vinyl butyrate, are useful as well.

The ethylene copolymers have melt indexes, as measured by ASTM 1238-52T, of about 2–100 (preferably 10–25) with polymerized ethylene content of about 67–84 (preferably 74–77) weight percent. Correspondingly, the polymerized ester content of useful ethylene copolymers is about 16–23 (preferably 23–26) weight percent. Additionally, ethylene copolymers containing minor amounts (i.e., up to about 3 weight percent) of polymerizable copolymers, such as acrylic acid, methacrylic acid, itaconic acid, acrylamide, isobutyl acrylate, beta dimethylaminoethyl methacrylate, beta hydroxyethyl acrylate, diallyl maleate, diallyl phthalate, diallyl ether, or ethylene glycol dimethacrylate, are useful as well.

The ethylene copolymer should be present in the hot melt blend in about 15–30 weight percent, preferably about 18–22 weight percent.

The optional low molecular weight polyethylene is present in the compositions of the present invention in sufficient amount to raise the softening point to a desired level. Thus a higher softening point, e.g., the finished carpet.

Optionally, an additional ingredient of suitable backsize adhesive compositions of this invention is paraffin wax. Paraffin waxes having a melting point of about 146°F. to 158°F., low needle point penetration (6–24 at 77°F.) and low oil content (0.1 to 0.25 percent) are preferred. Generally, their presence up to about 5 weight percent is suitable to facilitate application of the blend to the carpet by adjusting the melt-viscosity of the composition to the required level.

The use of an antioxidant, such as butylated hydroxytoluene, in about 0.1–0.3 weight percent is advantageous.

Fillers, such as calcium carbonate, aluminum hydrate, etc., in about 0–40 weight percent concentration may optionally be incorporated into the compositions of the present invention as a low cost extender which improves carpet hand to providing additional bulk to the carpet. Care must be taken not to add more than about 40 weight percent so as not to reduce the elongation of the backsize adhesive composition or the tuft bind of the carpet below the required levels.

The particular manner in which the ingredients are added to formulate the composition of the present invention is not critical and can be accomplished by any of the well known techniques.

The high strength of the carpet (in terms of tuft bind) made with compositions of the present invention is a significant advantage since in many uses (such as contract carpet) it is important to have a very high resistance to tuft pull out. A small child can readily damage a carpet having only a 5–10 pound tuft bind but would find it difficult or impossible to pull out tufts from a carpet having a 15 to 20 pound tuft bind. Quite likely the yarn would break before more than one or two tufts could be pulled out. Similarly, in applications such as hotel lobbies, theaters, etc., where a single tuft might readily be cause accidentally by users of the carpet, the high strength hot melt blend of the present invention would be of advantage.

Tuft bind, expressed in pounds, is measured by ASTM D 1335 or in some cases by a minor modification which gives comparable results. Values reported herein are the average of about 8–10 determinations. It will be appreciated that preparation of the carpet samples, following the teachings of U.S. Pat. No. 3,551,231, may lead to some variability in the tuft bind values because of the many variables that can affect the evenness of the coating and the uniformity of penetration of the hot melt into the carpet tufts. For prior art carpets, the spread is usually about 5–7 pounds while for carpets of the present invention the spread is usually about 3–4 pounds.

The following examples, wherein all parts and percentages are by weight, except where otherwise specified, further illustrate the advantages of the present invention.

COMPARATIVE EXAMPLES

The following blend, which is representative of the more successful filled prior art blends, was prepared:

| | |
|---|---|
| 15.0% | ethylene/vinyl acetate copolymer, melt index 1.7–2.3, 25% vinyl acetate, |
| 1.8% | low molecular weight polyethylene, 3500 molecular weight, 240°F. melting point, "AC"8, available from Allied Chemical Company, |
| 10.2% | microcrystalline wax, melting point 160°F., "Shellmax" 400, available from Shell Chemical Company, |
| 17.2% | unsaturated aliphatic thermoplastic hydrocarbon resin, melting point 100°C. ("Piccopale" 100SF, available from Hercules Inc.), |
| 25.6% | dicyclopentadiene alkylation polymer, melting point 77°F. ("Piccovar" AP 25, available from Hercules Inc.), |
| 0.2% | butylated hydroxytoluene (BHT), |
| 30.0% | calcium carbonate filler (No. 9 "Whiting"). |

The resulting blend had the following properties:

| | |
|---|---|
| Ring and ball softening point, °F. | 210 |
| Viscosity, cps. at 310°F. | 14,000 |
| Tensile, lb./in.$^2$ | 400–500 |
| Tensile Elongation, % | 10–15 |

Strength characteristics of the carpet backsized with the above blend according to the process of U.S. Pat. No. 3,551,231 are given in Table II.

TABLE II

| Carpet No. | Backsize oz./yd.$^2$ | Tuft Bind, lb. | Scrim Bond, lb./3"[1] |
|---|---|---|---|
| C1 | 27.0 | 13.0 | 28.0 |
| C2 | 18.0 | 10.0 | 16.0 |

[1]determined by ASTM D-2724-13.

An unfilled prior art blend of the following composition was also prepared:

31.5% ethylene/vinyl acetate copolymer (10–25

-continued

| | |
|---|---|
| | melt index, 25% vinyl acetate), |
| 3.5% | paraffin wax, melting point 146°F. ("Pacemaker" 53, available from Cities Service Oil Company), |
| 2.6% | low molecular weight polyethylene (2000 molecular weight, 0.96 gm./cm.$^3$ density) ("Polywax" 2000, available from Petrolite Corp., Bareco Div.), |
| 11.5% | microcrystalline wax, 160°F. melting point |
| 25.4% | unsaturated aliphatic thermoplastic hydrocarbon resin, melting point 100°C. |
| 25.4% | dicyclopentadiene alkylation polymer, melting point 77°F., |
| 0.1% | butylated hydroxytoluene. |

The blend had the following properties:

| | |
|---|---|
| Ring and ball softening point, °F. | 209 |
| Viscosity, cps. at 310°F. | 10,300 |
| Tensile, lb./in.$^2$ | 400–500 |
| Tensile elongation, % | 20–25 |

Strength characteristics of the carpet backsized with the above blend according to the process of U.S. Pat. No. 3,551,231 are given in Table III.

TABLE III

| Carpet No. | Backsize oz./yd.$^2$ | Tuft Bind, lb. | Scrim Bond, lb./3" |
|---|---|---|---|
| C3 | 18.7 | 14.5 | 26.2 |
| C4 | 25.0 | 14.6 | 40.0 |

The higher strength hot melt blends of the present invention are illustrated in the following examples:

EXAMPLE 1

30 Percent Filler Blend:

| | |
|---|---|
| 19.8% | ethylene/vinyl acetate copolymer, melt index 17–21, vinyl acetate content 25%, |
| 2.2% | paraffin wax, melting point of about 146°F. |
| 2.9% | low molecular weight (2000) polyethylene, density 0.96 g./cm.$^3$, ring and ball softening point (ASTM-E28) 257°F., |
| 45.0% | hydrocarbon resin, 60°C. ring and ball softening point, viscosity of 1.0 poise at 135°C. ("Piccovar" L60, available from Hercules Inc.), |
| 0.1% | butylated hydroxytoluene, |
| 30.0% | calcium carbonate. |

Physical properties of this blend are given under Blend No. 1 in Table I. Typical carpet properties backsized by the above hot melt blend are shown in Table IV.

TABLE IV

| Carpet No. | Backsize oz./yd.$^2$ | Tuft Bind, lb. | Scrim Bond, lb./3" |
|---|---|---|---|
| 1 | 22.2 | 18.5 | 27.8 |
| 2 | 27.6 | 21.3 | 31.8 |
| 3 | 25.7 | 18.9 | 29.3 |

EXAMPLE 2

The high performance blend can be further improved (at increased backsize cost) by elimination of the filler.

A typical example of this type of hot melt blend is shown in this example.

Unfilled Blend

- 28.3% ethylene/vinyl acetate copolymer, melt index of 17-21, vinyl acetate content 25 percent,
- 3.1% paraffin wax, melting point of about 146°F.,
- 4.0% low molecular weight (2000) polyethylene, density 0.96 g./cm.$^3$, ring and ball softening point (ASTM-E28) 257°F.,
- 64.5% hydrocarbon resin, 60°C. ring and ball softening point, viscosity of 1.0 poise at 135°C.,
- 0.1% butylated hydroxytoluene.

Physical properties of this blend are as follows:

| | |
|---|---|
| Ring and ball softening point, °F. | 238 |
| Viscosity, cps. at 310°F. | 5,337 |
| Tensile, lb./in.$^2$ | 335 |
| Tensile elongation, % | 1090 |

Typical carpet properties backsized by the above hot melt blend are shown in Table V.

TABLE V

| Carpet No. | Backsize oz./yd.$^2$ | Tuft Bind lb. | Scrim Bond lb./3" |
|---|---|---|---|
| 4 | 25.7 | 27.6 | 36.8 |

I claim:

1. A composition having a tensile elongation of about 700 to 1500 percent comprising
   A. about 15-30 weight percent ethylene/vinyl ester copolymer having a melt index of about 2 to 100, a copolymerized ethylene content of about 67 to 84 weight percent, a copolymerized vinyl ester content of about 16 to 33 weight percent, wherein the acid moiety of said vinyl ester contains 1 to 4 carbon atoms,
   B. about 30 to 70 weight percent of one hydrocarbon resin or a mixture of two or more hydrocarbon resins wherein said one hydrocarbon resin or said mixture has a ring and ball softening point of about 50°C. to 70°C. and a viscosity of about 0.5 to 1.5 poise at 135°C.,
   C. 0 to about 5 weight percent of an ethylene homopolymer having a molecular weight of about 1500 to 4000, density of about 0.91 to 0.96 g./cm.$^3$, and a melting point of about 220°F. to 270°F.,
   D. 0 to about 5 weight percent of a paraffin wax,
   E. 0 to about 0.3 weight percent of an antioxidant, and
   F. 0 to about 40 weight percent filler.
2. The composition of claim 1 having a tensile elongation of about 900 to 1000 percent.
3. The composition of claim 1 wherein said ethylene/vinyl ester copolymer is present in about 18 to 22 weight percent and has a melt index of about 10 to 25.
4. The composition of claim 3 wherein said copolymerized vinyl ester content is about 23 to 26 weight percent and the acid moiety thereof contains 2 to 3 carbon atoms.
5. The composition of claim 4 wherein said hydrocarbon resin is present in about 40 to 50 weight percent.
6. The composition of claim 5 having a tensile elongation of about 900 to 1000 percent.
7. The composition of claim 6 wherein said vinyl ester is vinyl acetate.
8. A carpet comprised of a primary backing material stitched with closely spaced erect loops of yarn to form a tufted structure, the bottom surface of the tufted structure having as a tuft bonding backsize adhesive coating the composition of claim 7, said carpet having an average tuft bind of at least 18 pounds.
9. A carpet comprised of a primary backing material stitched with closely spaced erect loops of yarn to form a tufted structure, the bottom surface of the tufted structure having as a tuft bonding backsize adhesive coating the composition of claim 4, said carpet having an average tuft bind of at least 18 pounds.
10. A carpet comprised of a primary backing material stitched with closely spaced erect loops of yarn to form a tufted structure, the bottom surface of the tufted structure having as a tuft bonding backsize adhesive coating the composition of claim 1, said carpet having an average tuft bind of at least 18 pounds.

* * * * *